United States Patent
Clum et al.

(10) Patent No.: US 10,077,664 B2
(45) Date of Patent: Sep. 18, 2018

(54) GAS TURBINE ENGINE COMPONENT HAVING ENGINEERED VASCULAR STRUCTURE

(71) Applicant: United Technologies Corporation, Farmington, CT (US)

(72) Inventors: Carey Clum, East Hartford, CT (US); Timothy J. Jennings, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 352 days.

(21) Appl. No.: 14/961,221

(22) Filed: Dec. 7, 2015

(65) Prior Publication Data

US 2017/0159447 A1 Jun. 8, 2017

(51) Int. Cl.
| | |
|---|---|
| *F01D 5/14* | (2006.01) |
| *F01D 9/02* | (2006.01) |
| *B22F 3/105* | (2006.01) |
| *B22D 25/02* | (2006.01) |
| *B22C 9/10* | (2006.01) |

(Continued)

(52) U.S. Cl.
CPC .............. *F01D 5/147* (2013.01); *B22C 9/108* (2013.01); *B22D 25/02* (2013.01); *B22F 3/1055* (2013.01); *B23K 15/0086* (2013.01); *F01D 5/186* (2013.01); *F01D 9/02* (2013.01); *F01D 11/08* (2013.01); *F01D 25/12* (2013.01); *F01D 25/30* (2013.01); *F02C 7/18* (2013.01); *F23R 3/002* (2013.01); *B33Y 10/00* (2014.12);

(Continued)

(58) Field of Classification Search
CPC ... F01D 5/14; F01D 5/187; F01D 5/18; F01D 5/182; F01D 5/183
See application file for complete search history.

(56) References Cited

U.S. PATENT DOCUMENTS 4,407,632 A * 10/1983 Liang ...................... F01D 5/187
415/115
5,752,801 A 5/1998 Kennedy
(Continued)

FOREIGN PATENT DOCUMENTS

| DE | 10261071 A1 | 7/2004 |
|---|---|---|
| EP | 475658 A1 | 3/1992 |

(Continued)

OTHER PUBLICATIONS

International Search Report and Written Opinion for Application No. PCT/US2013/032202 dated Jan. 27, 2014.

(Continued)

*Primary Examiner* — Richard Edgar
*Assistant Examiner* — John S Hunter
(74) *Attorney, Agent, or Firm* — Carlson, Gaskey & Olds, P.C.

(57) ABSTRACT

A component according to an exemplary aspect of the present disclosure includes, among other things, a wall and a vascular engineered lattice structure formed inside of the wall. The vascular engineered lattice structure includes a plurality of nodes, a plurality of branches that extend between the plurality of nodes, and a plurality of passages extending between the plurality of nodes and the plurality of passages. Further, at least one of the branches is non-circular in cross-section.

21 Claims, 3 Drawing Sheets

(51) Int. Cl.
  *F01D 25/12* (2006.01)
  *B23K 15/00* (2006.01)
  *F23R 3/00* (2006.01)
  *F02C 7/18* (2006.01)
  *F01D 11/08* (2006.01)
  *F01D 25/30* (2006.01)
  *F01D 5/18* (2006.01)
  *B33Y 80/00* (2015.01)
  *B33Y 10/00* (2015.01)

(52) U.S. Cl.
  CPC ........... *B33Y 80/00* (2014.12); *F05D 2220/32* (2013.01); *F05D 2230/21* (2013.01); *F05D 2260/202* (2013.01)

(56) References Cited

U.S. PATENT DOCUMENTS

| | | | |
|---|---|---|---|
| 5,975,841 | A | 11/1999 | Lindemuth et al. |
| 6,126,396 | A | 10/2000 | Doughty et al. |
| 6,508,623 | B1 | 1/2003 | Shiozaki et al. |
| 6,955,523 | B2 | 10/2005 | McClelland |
| 7,540,710 | B2 | 6/2009 | Grote et al. |
| 7,670,675 | B2 | 3/2010 | Heselhaus et al. |
| 8,052,389 | B2 | 11/2011 | Kopmels |
| 8,793,871 | B2 * | 8/2014 | Morrison ............... B22D 19/00 29/527.5 |
| 2011/0262695 | A1 | 10/2011 | Lee et al. |
| 2011/0265406 | A1 | 11/2011 | Morrison et al. |
| 2011/0268580 | A1 | 11/2011 | Bryk et al. |
| 2012/0006518 | A1 | 1/2012 | Lee et al. |
| 2012/0034075 | A1 | 2/2012 | Hsu et al. |
| 2012/0237786 | A1 | 9/2012 | Morrison et al. |
| 2012/0243970 | A1 | 9/2012 | Hellgren et al. |

FOREIGN PATENT DOCUMENTS

| | | |
|---|---|---|
| EP | 2199725 A1 | 6/2010 |
| EP | 2199725 B1 | 10/2011 |
| GB | 2284825 A | 6/1995 |
| WO | 03006883 A1 | 1/2003 |
| WO | 2007014005 A1 | 2/2007 |
| WO | 2011069015 A2 | 6/2011 |
| WO | 2011133359 A1 | 10/2011 |
| WO | 2013013995 A1 | 1/2013 |

OTHER PUBLICATIONS

International Preliminary Report for application No. PCT/US2013/041054 dated Sep. 4, 2011.
International Search Report and Written Opinion for Application No. PCT/US2013/041054 dated Jan. 27, 2014.
International Search Report and Written Opinion for Application No. PCT/US2013/032003 dated Dec. 17, 2013.

* cited by examiner

GAS TURBINE ENGINE COMPONENT HAVING ENGINEERED VASCULAR STRUCTURE

BACKGROUND

This disclosure relates to a gas turbine engine, and more particularly to a gas turbine engine component having an engineered vascular structure with at least one spoke having a non-circular cross-section.

Gas turbine engines typically include a compressor section, a combustor section, and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

Due to exposure to hot combustion gases, numerous components of a gas turbine engine may include cooling schemes that circulate airflow to cool the component during engine operation. Thermal energy is transferred from the component to the airflow as the airflow circulates through the cooling scheme to cool the component. Known cooling schemes may be inefficient and lack structural integrity.

SUMMARY

A component according to an exemplary aspect of the present disclosure includes, among other things, a wall and a vascular engineered lattice structure formed inside of the wall. The vascular engineered lattice structure includes a plurality of nodes, a plurality of branches that extend between the plurality of nodes, and a plurality of passages extending between the plurality of nodes and the plurality of branches. Further, at least one of the branches is non-circular in cross-section.

In a further embodiment of the foregoing component, the at least one of the branches includes an airfoil shape in cross-section.

In a further embodiment of any of the foregoing components, the at least one of the branches includes a cross-section having a surface extending substantially perpendicular to an expected direction of fluid flow.

In a further embodiment of any of the foregoing components, the at least one of the branches includes a triangular shape in cross-section.

In a further embodiment of any of the foregoing components, the component includes a first branch and a second branch at a location downstream of the first branch, each of the first and second branches being non-circular in cross-section, and the cross-sections of the first and second branches are dissimilar.

In a further embodiment of any of the foregoing components, the cross-section of the first branch is an airfoil shape, and the cross-section of the second branch has a surface extending substantially perpendicular to an expected direction of fluid flow.

In a further embodiment of any of the foregoing components, the plurality of nodes and the plurality of branches are uniformly distributed throughout the vascular engineered lattice structure.

In a further embodiment of any of the foregoing components, the plurality of nodes and the plurality of branches are non-uniformly distributed throughout the vascular engineered lattice structure.

In a further embodiment of any of the foregoing components, the at least one of the branches is hollow and includes an internal flow passageway.

In a further embodiment of any of the foregoing components, the plurality of branches are one of (1) orthogonal to the plurality of nodes and (2) non-orthogonal to the plurality of nodes.

In a further embodiment of any of the foregoing components, the wall is part of a blade, a vane, or a blade outer air seal (BOAS) of a gas turbine engine.

In a further embodiment of any of the foregoing components, the wall is a gas path wall exposed to a core airflow of a gas turbine engine.

A component according to another exemplary aspect of the present disclosure includes, among other things, a wall and a vascular engineered lattice structure formed inside of the wall. The vascular engineered lattice structure includes a plurality of nodes, a plurality of branches that extend between the plurality of nodes, and a plurality of passages extending between the plurality of nodes and the plurality of passages. A first one of the branches and a second one of the branches are both non-circular in cross-section. Further, the cross-sections of the first and second branches are dissimilar.

In a further embodiment of the foregoing component, the cross-section of the first branch is an airfoil shape, and the cross-section of the second branch has a surface extending substantially perpendicular to an expected direction of fluid flow.

In a further embodiment of any of the foregoing components, the second branch includes a triangular shape in cross-section.

In a further embodiment of any of the foregoing components, the second branch is downstream of the first branch.

A method for producing a component according to an exemplary aspect of the present disclosure includes, among other things, forming a vascular engineered lattice structure inside of a wall of the component. The vascular engineered lattice structure includes a plurality of nodes, a plurality of branches that extend between the plurality of nodes, and a plurality of passages extending between the plurality of nodes and the plurality of passages. Further, at least one of the branches is non-circular in cross-section.

In a further embodiment of the foregoing method, the step of forming the vascular engineered lattice structure includes forming a first branch and a second branch at a location downstream of the first branch, each of the first and second branches being non-circular in cross-section, and the cross-sections of the first and second branches are dissimilar.

In a further embodiment of any of the foregoing methods, the cross-section of the first branch is an airfoil shape, and the cross-section of the second branch has a surface extending substantially perpendicular to an expected direction of fluid flow.

In a further embodiment of any of the foregoing methods, the step of forming the vascular engineered lattice structure includes forming a core using an additive manufacturing process, and using the core to cast the vascular engineered lattice structure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
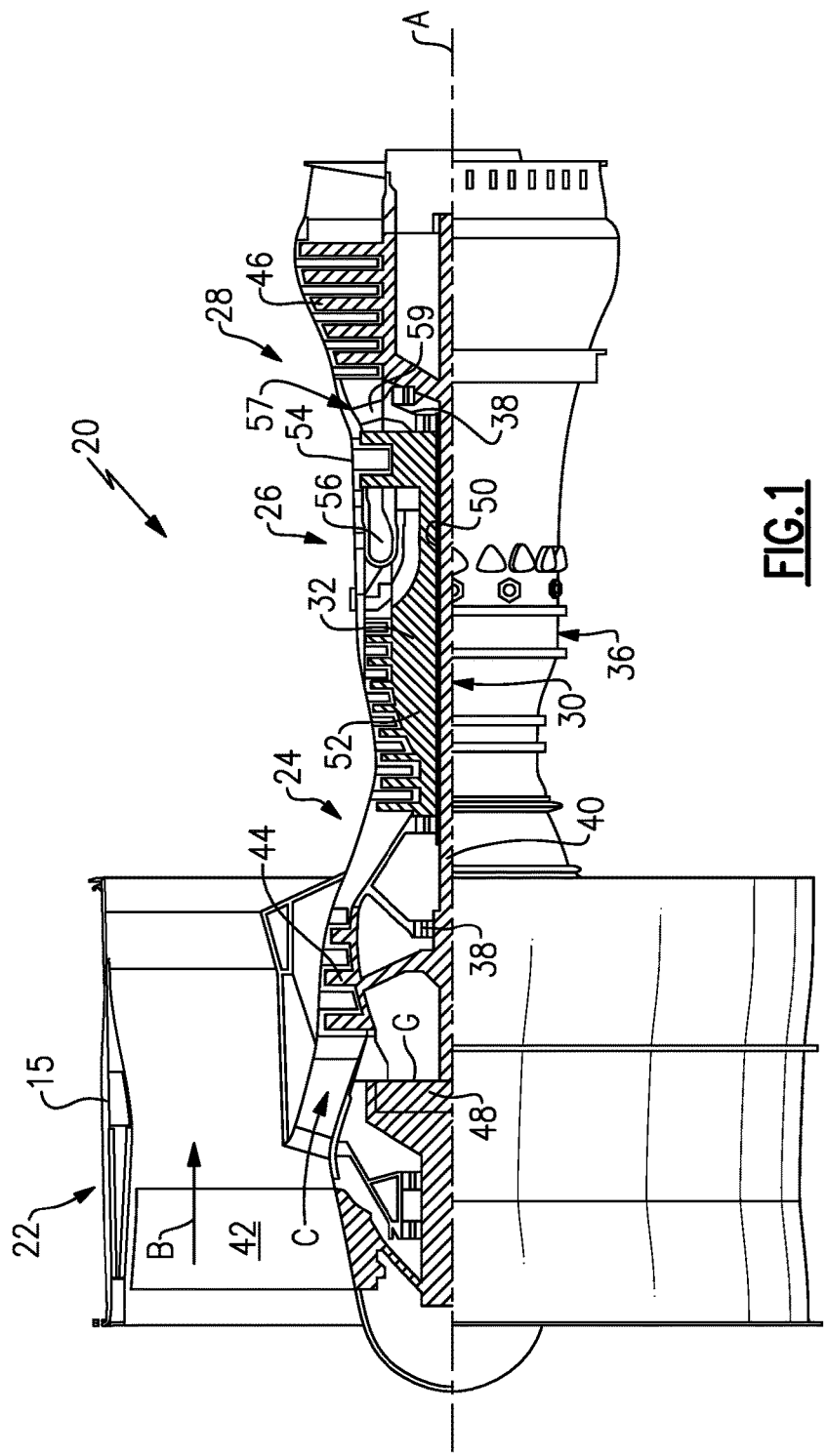
FIG. 1 illustrates a schematic, cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core airflow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The geared architecture 48 in this example includes a gearbox G, which is a housing, and encloses one or more gears, such as a sun gear and one or more planetary gears. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive geared architecture 48 may be varied. For example, geared architecture 48 may be located aft of combustor section 26 or even aft of turbine section 28, and fan section 22 may be positioned forward or aft of the location of geared architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 feet/second (350.5 meters/second).

Various components of the gas turbine engine 20, including but not limited to the airfoils of the blades and the vanes of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling schemes for cooling the parts during engine operation.

Among other features, this disclosure relates to gas turbine engine component cooling schemes that include vascular engineered lattice structures inside the walls of the gas turbine engine component. The exemplary structures described herein provide effective localized convective cooling, and is some embodiments, can provide resupply and film cooling for gas turbine engine components that may be subject to the hot combustion gases that are communicated through the core flow path C.

Figure 2:
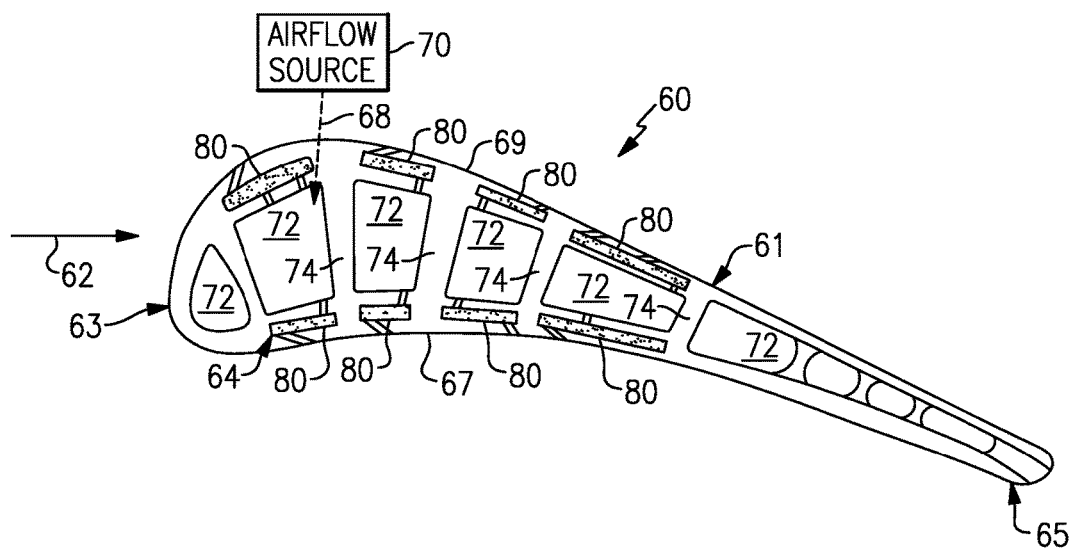
FIG. 2 illustrates a component that can be incorporated into a gas turbine engine.

FIG. 2 illustrates a component 60 that can be incorporated into a gas turbine engine, such as the gas turbine engine 20 of FIG. 1. The component 60 includes a body portion 61 that axially extends between a leading edge portion 63 and a trailing edge portion 65. The body portion 61 may further include a first (pressure) side wall 67 and a second (suction) side wall 69 that are spaced apart from one another and axially extend between the leading edge portion 63 and the trailing edge portion 65. Although shown in cross-section, the body portion 61 would also extend radially across a span.

In this embodiment, the body portion 61 is representative of an airfoil. For example, the body portion 61 could be an airfoil that extends from platform and root portions (i.e., where the component is a blade), or could alternatively extend between inner and outer platforms (i.e., where the component 60 is a vane). In yet another embodiment, the component 60 could include a non-airfoil component, including but not limited to, a blade outer air seal (BOAS), a combustor liner, a turbine exhaust case liner, or any other part that may require dedicated cooling.

A gas path 62 is communicated axially downstream through the gas turbine engine 20 in a direction that extends from the leading edge portion 63 toward the trailing edge portion 65 of the body portion 61. The gas path 62 represents the communication of core airflow along the core flow path C (see FIG. 1).

A cooling scheme 64 may be disposed inside of the body portion 61 for cooling the internal and external surface areas of the component 60. For example, the cooling scheme 64 can include one or more cavities 72 that may radially, axially, and/or circumferentially extend inside of the body portion 61 to establish cooling passages for receiving an airflow 68 (or some other fluid). The airflow 68 may be communicated into one or more of the cavities 72 from an airflow source 70 that is external to the component 60 to cool the component 60. In one embodiment, the airflow 68 is communicated to the cooling scheme 64 through a root portion of the component 60 (e.g., where the component is a blade).

The airflow 68 is generally of a lower temperature than the airflow of the gas path 62 that is communicated across the body portion 61. In one particular embodiment, the airflow 68 is a bleed airflow that can be sourced from the compressor section 24 or any other portion of the gas turbine engine 20 that has a lower temperature as compared to the component 60. The airflow 68 can be circulated through the cooling scheme 64 to transfer thermal energy from the component 60 to the airflow 68 thereby cooling the component 60.

In this non-limiting embodiment, the exemplary cooling scheme 64 includes a plurality of cavities 72 that extend inside of the body portion 61. However, the cooling scheme 64 is not necessarily limited to the configuration shown, and it will be appreciated that a greater or fewer number of cavities, including only a single cavity, may be defined inside of the body portion 61. The cavities 72 communicate the airflow 68 through the cooling scheme 64, such as along a serpentine or linear path, to cool the body portion 61.

In one embodiment, ribs 74 extend between the first side wall 67 and the second side wall 69 of the body portion 61. The ribs 74 may also radially extend across a span of the body portion 61.

The exemplary cooling scheme 64 may additionally include one or more vascular engineered lattice structures 80 that are disposed inside sections of the body portion 61 of the component 60. For example, discrete portions of the component 60 may embody a vascular engineered lattice structure, or the entire component 60 can be constructed of a vascular engineered lattice structure.

Figure 3:
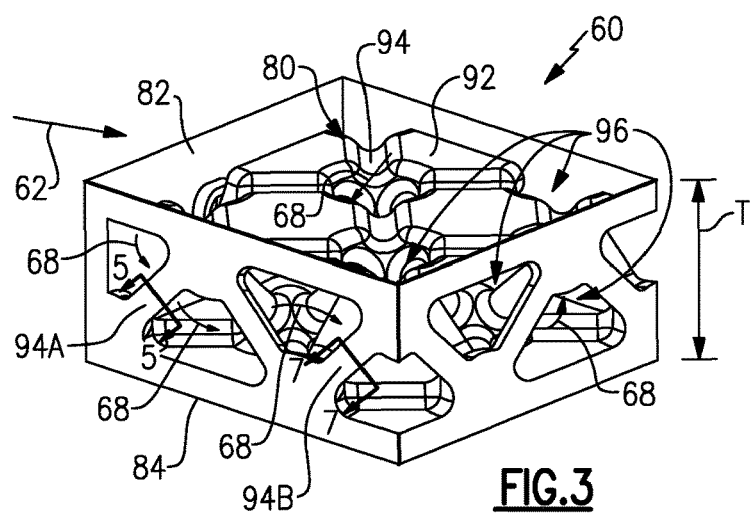
FIG. 3 illustrates an exemplary engineered vascular structure.
Figure 4:
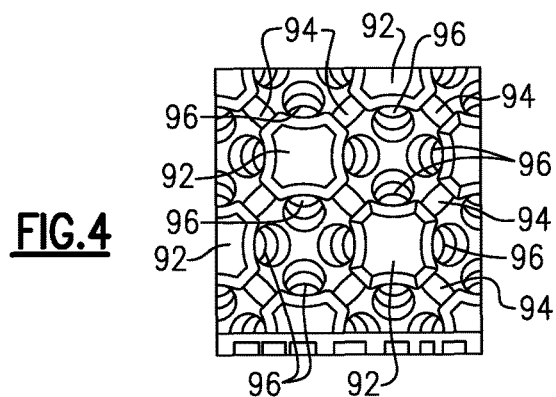
FIG. 4 illustrates another view of the engineered vascular structure of FIG. 3.

FIGS. 3 and 4 illustrate one exemplary vascular engineered lattice structure 80 that can be incorporated into a component 60. The vascular engineered lattice structure 80 may be incorporated into any section or sections of a gas turbine engine component. In this disclosure, the term "vascular engineered lattice structure" denotes a structure of known surface and flow areas that includes a specific structural integrity.

As discussed in greater detail below, the example vascular engineered lattice structure 80 of FIGS. 3 and 4 is a solid vascular structure. In this embodiment, the vascular engineered lattice structure 80 embodies a solid lattice structure in which airflow is communicated over and around the solid lattice structure thereby governing flow and providing structural support.

The specific design and configuration of the vascular engineered lattice structure 80 of FIG. 3 is not intended to be limited to only the configuration shown. It will be appreciated that because the vascular engineered lattice structure 80 is an engineered structure, the vascular arrangement of these structures can be tailored to the specific cooling and structural needs of any given gas turbine engine component. In other words, the vascular engineered lattice structure 80 can be tailored to match external heat load and local life requirements by changing the design and density of the vascular engineered lattice structure 80. The actual design of any given vascular engineered lattice structure may depend on geometry requirements, pressure loss, local cooling flow, cooling air heat pickup, thermal efficiency, film effectiveness, overall cooling effectiveness, aerodynamic mixing, and produceability considerations, among other gas turbine engine specific parameters. In one embodiment, the vascular engineered lattice structure 80 is sized based on a minimum size that can be effectively manufactured and that is not susceptible to becoming plugged by dirt or other debris.

The exemplary vascular engineered lattice structure 80 extends between a first wall 82 and a second wall 84 of the component 60. The first wall 82 is spaced from the second wall 84. The first wall 82 may be exposed to the gas path 62, whereas the second wall 84 may be positioned remote from the gas path 62. For example, the second wall 84 could face into one of the cooling source cavities 72 of the cooling scheme 64 (see FIG. 2). The vascular engineered lattice structure 80 includes a thickness T between the first wall 82 and the second wall 84. This disclosure is not limited to any particular thickness T.

The vascular engineered lattice structure 80 includes a plurality of nodes 92, a plurality of branches 94 that extend between the nodes 92, and a plurality of open passages 96 between the branches 94 and the nodes 92. The nodes 92, branches 94, and open passages 96 can be manufactured as a single contiguous structure made of the same material.

In this "solid" lattice structure configuration, airflow 68 is circulated through the open passages 96 to cool the component 60 in the space between the walls 82, 84. The airflow 68 is circulated over and around these parts as part of a porous flow area. For example, the "solid" lattice structure includes multiple continuous solid branches 94 over which airflow 68 is passed. The "solid" lattice structure forms circuitous passages for the airflow 68 to traverse around as it migrates through the vascular engineered lattice structure to maximize the convective cooling surface area and coolant mixing around the nodes 92 and the branches 94. The nodes 92 and the branches 94 additionally act as structural members that resist and dampen pressure, rotation forces, and vibratory loads.

The exemplary vascular engineered lattice structure 80 establishes a ratio of cooling area to structural area. The cooling area is established by the open passages 96, while the nodes 92 and branches 94 determine the amount of structural area. In one embodiment, the amount of cooling area exceeds the structural area (cooling area>structural area). In another embodiment, a ratio of the cooling area to the structural area is less than 1 (cooling area<structural area). In yet another embodiment, a ratio of the cooling area to the structural area is between 1 and 4. Other configurations are also contemplated.

The vascular engineered lattice structure 80 can be manufactured by using a variety of manufacturing techniques. For example, the vascular engineered lattice structure 80 may be created using an additive manufacturing process such as direct metal laser sintering (DMLS). Another additive manufacturing process that can be used to manufacture the vascular engineered lattice structure 80 is electron beam melting (EBM). In another embodiment, select laser sintering (SLS) or select laser melting (SLM) processes may be utilized.

In yet another embodiment, a casting process can be used to create the vascular engineered lattice structure 80. For example, an additive manufacturing process can be used to produce a ceramic or molybdenum based core (such as a Refractory Metal Core (RMC)) that can be used to cast the vascular engineered lattice structure 80. In one embodiment, the additive manufacturing process includes utilizing a powder bed technology for direct fabrication of lattice geometry features, while in another embodiment the additive manufacturing process can be used to produce "core" geometry features which can then be integrated and utilized directly in the investment casting process using a lost wax process.

The number, size and distribution of nodes 92, branches 94 and open passages 96 can vary from the specific configuration shown. In other words, the configuration illustrated by FIGS. 3 and 4 is but one possible design. The branches 94 may extend orthogonally or non-orthogonally to the nodes 92. The nodes 92 and branches 94 can be manufactured as a single contiguous structure made of the same material. In one embodiment, the nodes 92 and branches 94 are uniformly distributed throughout the vascular engineered lattice structure 80. In another embodiment, the nodes 92 and branches 94 are non-uniformly distributed throughout the vascular engineered lattice structure 80.

The nodes 92 and the branches 94 additionally act as structural members that can be tailored to "tune" steady and unsteady component vibration responses in order to resist and optimally manage steady and unsteady pressure forces, centrifugal bending and curling stresses, as well as provide for improved component local and section average creep and untwist characteristics and capability. In one embodiment, one or more of the nodes 92 and branches 94 may include augmentation features that augment the heat transfer effect of the airflow 68 as it is communicated through the vascular engineered lattice structure 80. The augmentation features can also be made using the additive manufacturing processes describe above.

As mentioned above, the vascular arrangement of the vascular engineered lattice structure 80 can be tailored to the specific cooling and structural needs of any given gas turbine engine component. For example, a first portion of the vascular engineered lattice structure 80 can include a different combination of nodes 92, branches 94 and open passages 96 compared to a second portion of the vascular engineered lattice structure 80. In one embodiment, a first portion of the vascular engineered lattice structure 80 may include a greater amount of cooling area whereas a second portion of the vascular engineered lattice structure 80 may provide a greater amount of structural area.

Further, during normal operation, airflow flows through the vascular engineered lattice structure 80 in a way that prevents back flow. In this respect, certain components may require a relatively high pressure for the airflow 68 relative to the fluid within the gas path 62. Other components may require a lower airflow 68 pressure. Further still, certain portions of the same component may have different pressure requirements. In one example, an upstream end of a component, such as a BOAS, requires a greater airflow 68 pressure than a downstream end of the same component.

In one non-limiting example of the present disclosure, the geometry of the branches 94 provides an appropriate pressure drop (and thus substantially avoids back flow) for a particular component or for particular portions of the same component. In one example of this disclosure, when viewed in cross-section (e.g., along a sectional view taken substantially perpendicular to a length of the branches 94) the branches 94 are non-circular.

Figure 5:
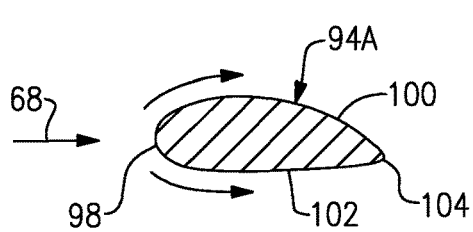
FIG. 5 is a view taken along line 5-5 of FIG. 3, and illustrates an example portion of the engineered vascular structure.
Figure 6:
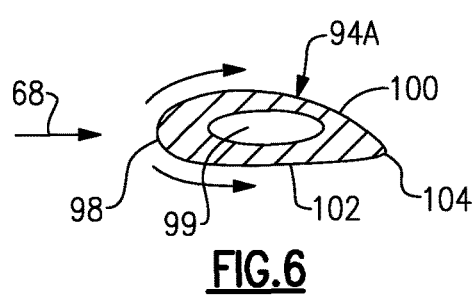
FIG. 6 is a view taken along line 5-5 of FIG. 3, and illustrates an example portion of the engineered vascular structure having an internal flow passage.

One example branch geometry is shown in FIG. 5. FIG. 5 is a sectional view taken along line 5-5 from FIG. 3. In FIG. 5, the branch 94A includes an airfoil shape in cross-section. As is known of airfoil shapes, the branch 94A includes a convex leading edge 98 facing an expected direction of the airflow 68, and first and second side walls 100, 102 extending between the leading edge 98 and a trailing edge 104. The airfoil shape of the branch 94A reduces drag and pressure drop on the airflow 68, and is thus useful in components, or locations within components, that require a relatively high airflow 68 pressure to prevent backflow. While referenced herein as a "solid" structure, in another embodiment (shown in FIG. 6) the branch 94A may be a hollow branch including an internal flow passageway 99 allowing a flow of cooling fluid to pass through the branch 94A. The internal flow passageway 99 could, in some examples, be configured to communicate fluid between similar internal passageways in at least some of the other branches 94 and nodes 92.

Figure 7:
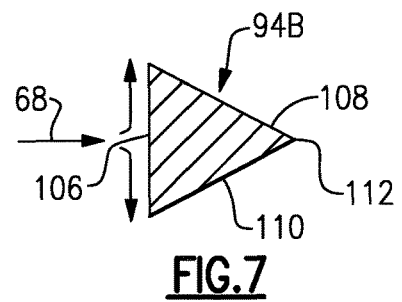
FIG. 7 is a view taken along line 7-7 of FIG. 3, and illustrates another example portion of the engineered vascular structure.

Another example branch geometry is shown in FIG. 7. In the example of FIG. 3, the branch 94B of FIG. 7 is included in the same component as the branch 94A and is downstream of the branch 94A relative to the airflow 68. While the branches 94A, 94B are both non-circular in cross-section, they have dissimilar cross-sections. While only two example cross-sectional geometries are shown in this disclosure, other geometries can be included.

Figure 8:
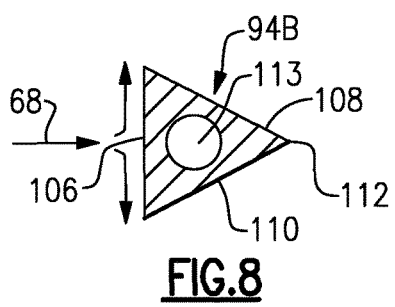
FIG. 8 is a view taken along line 7-7 of FIG. 3, and illustrates another example portion of the engineered vascular structure having an internal flow passage.

In this example, the branch 94B includes a planar leading surface 106 that is substantially perpendicular to an expected direction of airflow 68. In this example, the branch 94B further includes a substantially triangular cross-section, with planar walls 108, 110 extending between the leading surface 106 and a trailing edge 112. Other cross-sectional shapes that would have a substantially perpendicular leading surface come within the scope of this disclosure including, but not limited to, square shapes, rectangular shapes, etc. Further, and similar to the embodiment of FIG. 6, the branch 94B could, in some embodiments, be a hollow structure having an internal flow passageway 113 to allow fluid to flow therein (see FIG. 8).

By providing a substantially perpendicular leading surface 106, the branch 94B increases drag on the airflow 68 and thus increases pressure drop. In one example, the branch 94B is provided within a component, such as a BOAS, at a downstream location that does not require a high airflow 68 pressure to prevent back flow. Further, by providing an increased pressure drop with the branch 94B, the airflow 68 is not of such a high pressure that it will negatively impact film cooling. Stated another way, the geometry of the branch 94B can be used to provide a desirable "blowing ratio."

Again, the geometries of FIGS. 5 and 7 are only examples. It should be understood that some components could include any number of branches having the geometries shown in FIGS. 5 and 7. The non-circular geometries of FIGS. 5 and 7 can be used in components that include some circular geometries (in cross-section). Again, as generally mentioned above, this disclosure allows one to essentially tune the airflow for a particular component to account for design considerations such as pressure drop, backflow, and blowing ratio.

The exemplary vascular engineered lattice structures described in this disclosure may be incorporated into any relatively high heat load gas turbine engine applications where both convective and film cooling is desired. Among other possible design configurations, the vascular engineered lattice structures of this disclosure may be implemented as a co-flow or counter-flow configurations and may either include or exclude airflow resupply to more efficiently provide localized convective cooling and film cooling to achieve extended component operating life.

It should be understood that terms such as "fore," "aft," "axial," "radial," and "circumferential" are used above with reference to the normal operational attitude of the engine 20. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A component, comprising:
a wall; and
a vascular engineered lattice structure formed inside of the wall, the vascular engineered lattice structure including a plurality of nodes, a plurality of branches that extend between the plurality of nodes, and a plurality of passages extending between the plurality of nodes and the plurality of branches, wherein at least one of the plurality of branches is non-circular in cross-section; and
wherein the at least one of the plurality of branches includes an airfoil shape in cross-section.

2. The component as recited in claim 1, wherein another one of the plurality of branches includes a cross-section having a surface extending substantially perpendicular to an expected direction of fluid flow.

3. The component as recited in claim 2, wherein another one of the plurality of branches includes a triangular shape in cross-section.

4. The component as recited in claim 1, wherein:
the component includes a first branch of the plurality of branches and a second branch of the plurality of branches at a location downstream of the first branch;
each of the first and second branches being non-circular in cross-section; and
the cross-sections of the first and second branches are dissimilar.

5. The component as recited in claim 4, wherein:
the cross-section of the first branch is an airfoil shape; and
the cross-section of the second branch has a surface extending substantially perpendicular to an expected direction of fluid flow.

6. The component as recited as recited in claim 1, wherein the plurality of nodes and the plurality of branches are uniformly distributed throughout the vascular engineered lattice structure.

7. The component as recited in claim 1, wherein the plurality of nodes and the plurality of branches are non-uniformly distributed throughout the vascular engineered lattice structure.

8. The component as recited in claim 1, wherein the plurality of branches are one of (1) orthogonal to the plurality of nodes and (2) non-orthogonal to the plurality of nodes.

9. The component as recited in claim 1, wherein the wall is part of an airfoil of a gas turbine engine.

10. The component as recited in claim 9, wherein the wall is a gas path wall exposed to a core airflow of a gas turbine engine.

11. The component as recited in claim 1, wherein the at least one of the plurality of branches is hollow and includes an internal flow passageway.

12. A component, comprising:
a wall; and
a vascular engineered lattice structure formed inside of the wall, the vascular engineered lattice structure including a plurality of nodes, a plurality of branches that extend between the plurality of nodes, and a plurality of passages extending between the plurality of nodes and the plurality of branches, wherein at least one of the plurality of branches is non-circular in cross-section, the at least one of the plurality of branches including a triangular shape in cross-section or an airfoil shape in cross-section, and wherein the at least one of the plurality of branches is hollow and includes an internal flow passageway.

13. A component, comprising:
a wall; and
a vascular engineered lattice structure formed inside of the wall, the vascular engineered lattice structure including a plurality of nodes, a plurality of branches that extend between the plurality of nodes, and a plurality of passages extending between the plurality of nodes and the plurality of branches, wherein a first branch of the plurality of branches and a second branch of the plurality of branches are both non-circular in cross-section, and wherein the cross-sections of the first and second branches are dissimilar; and wherein the cross-section of the first branch is an airfoil shape.

14. The component as recited in claim 13, wherein:
the cross-section of the second branch has a surface extending substantially perpendicular to an expected direction of fluid flow.

15. The component as recited in claim 14, wherein the second branch includes a triangular shape in cross-section.

16. The component as recited in claim 13, wherein the second branch is downstream of the first branch.

17. The component as recited in claim 13, wherein at least one of the first and second branches is hollow and includes an internal flow passageway.

18. A method for producing a component, comprising the steps of:
forming a vascular engineered lattice structure inside of a wall of the component, the vascular engineered lattice structure including a plurality of nodes, a plurality of branches that extend between the plurality of nodes, and a plurality of passages extending between the plurality of nodes and the plurality of branches, wherein at least one of the plurality of branches is non-circular in cross-section;

wherein the cross-section of the at least one of the plurality of branches is an airfoil shape; and wherein the step of forming the vascular engineered lattice structure includes forming a core using an additive manufacturing process and using the core to cast the vascular engineered lattice structure.

19. The method as recited in claim 18, wherein the step of forming the vascular engineered lattice structure includes:
forming a first branch of the plurality of branches and a second branch of the plurality of branches at a location downstream of the first branch, each of the first and second branches being non-circular in cross-section, and wherein the cross-sections of the first and second branches are dissimilar.

20. The method as recited in claim 19, wherein the cross-section of the first branch is an airfoil shape, and wherein the cross-section of the second branch has a surface extending substantially perpendicular to an expected direction of fluid flow.

21. The method as recited in claim 19, wherein at least one of the first and second branches is hollow and includes an internal flow passageway, and the cross-section of the second branch is a triangular shape.

* * * * *